US011068192B1

(12) United States Patent
Greenwood et al.

(10) Patent No.: US 11,068,192 B1
(45) Date of Patent: Jul. 20, 2021

(54) UTILIZING MUTIPLE SNAPSHOT SOURCES FOR CREATING NEW COPY OF VOLUME IN A NETWORKED ENVIRONMENT WHEREIN ADDITIONAL SNAPSHOT SOURCES ARE RESERVED WITH LOWER PERFORMANCE LEVELS THAN A PRIMARY SNAPSHOT SOURCE

(71) Applicant: Amazon Technologies, Inc., Seattle, WA (US)

(72) Inventors: Christopher Magee Greenwood, Seattle, WA (US); James Michael Thompson, Seattle, WA (US); Igor A. Kostic, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 64 days.

(21) Appl. No.: 16/365,442

(22) Filed: Mar. 26, 2019

(51) Int. Cl.
*G06F 3/06* (2006.01)

(52) U.S. Cl.
CPC .............. *G06F 3/065* (2013.01); *G06F 3/067* (2013.01); *G06F 3/0613* (2013.01)

(58) Field of Classification Search
CPC ........ G06F 3/065; G06F 3/0613; G06F 3/067; G06F 11/1458–1469; G06F 11/1448
See application file for complete search history.

(56) References Cited

U.S. PATENT DOCUMENTS

| | | |
|---|---|---|
| 5,434,994 A | 7/1995 | Shaheen et al. |
| 5,574,878 A | 11/1996 | Onodera et al. |
| 6,463,509 B1 | 10/2002 | Teoman et al. |
| 7,502,960 B1 | 3/2009 | Todd et al. |
| 7,788,664 B1 | 8/2010 | Janakiraman et al. |

(Continued)

FOREIGN PATENT DOCUMENTS

| | | |
|---|---|---|
| WO | WO 2011/088261 A3 | 7/2011 |
| WO | WO 2017/028885 A1 | 2/2017 |
| WO | WO 2019/212768 A1 | 7/2019 |

OTHER PUBLICATIONS

U.S. Appl. No. 16/049,620, filed Jul. 30, 2018, Pavel Labovich.

(Continued)

*Primary Examiner* — Reginald G Bragdon
*Assistant Examiner* — Chie Yew
(74) *Attorney, Agent, or Firm* — Knobbe, Martens, Olson & Bear, LLP

(57) ABSTRACT

Aspects relate to techniques for using read-only volume replicas in a distributed computing environment to enable over-subscription on server performance. In order to provide a good customer experience, the I/O handling replicas of a volume are typically reserved at a high percentage of the customer's desired performance. A read-only replica of the volume does not serve user I/O, and can therefore be reserved at a much lower percentage of desired performance. Particularly, as the number of read-only replicas increases, the performance reservation can be lowered due to the statistical likelihood that the server(s) hosting at least one read-only replica will have sufficient performance to support the desired reads during new volume creation (even though that performance has not been fully reserved). Aspects relate to techniques for selecting among read-only replicas to serve reads during creation of a new volume copy.

20 Claims, 9 Drawing Sheets

(56) References Cited

U.S. PATENT DOCUMENTS

| | | | |
|---|---|---|---|
| 7,895,261 B2 | 2/2011 | Jones et al. | |
| 7,975,102 B1 | 7/2011 | Hyer et al. | |
| 8,280,853 B1 | 10/2012 | Lai et al. | |
| 8,285,687 B2 | 10/2012 | Voll et al. | |
| 8,589,574 B1 | 11/2013 | Cormie et al. | |
| 8,688,660 B1 | 4/2014 | Sivasubramanian et al. | |
| 8,725,968 B2 | 5/2014 | Wada | |
| 8,849,758 B1 | 9/2014 | Sivasubramanian et al. | |
| 9,003,227 B1 | 4/2015 | Patel et al. | |
| 9,110,600 B1 | 8/2015 | Brooker et al. | |
| 9,246,996 B1 | 1/2016 | Brooker et al. | |
| 9,503,517 B1 | 11/2016 | Brooker et al. | |
| 9,563,385 B1 | 2/2017 | Kowalski et al. | |
| 9,665,307 B1 | 5/2017 | LeCrone et al. | |
| 9,720,620 B1 | 8/2017 | Wei et al. | |
| 9,823,840 B1 | 11/2017 | Brooker et al. | |
| 9,826,030 B1 | 11/2017 | Dhoolam et al. | |
| 9,946,604 B1 | 4/2018 | Glass | |
| 10,055,352 B2 | 8/2018 | Wei et al. | |
| 10,452,296 B1 | 10/2019 | Greenwood et al. | |
| 10,459,655 B1 | 10/2019 | Greenwood et al. | |
| 10,505,862 B1 | 12/2019 | Dhoolam et al. | |
| 10,768,850 B2 | 9/2020 | Muniswamy-Reddy et al. | |
| 2002/0059253 A1 | 5/2002 | Albazz et al. | |
| 2002/0144070 A1 | 10/2002 | Watanabe et al. | |
| 2003/0028737 A1 | 2/2003 | Kaiya et al. | |
| 2003/0050974 A1 | 3/2003 | Mani-Meitav et al. | |
| 2003/0191930 A1 | 10/2003 | Viljoen et al. | |
| 2003/0204597 A1 | 10/2003 | Arakawa et al. | |
| 2004/0078419 A1 | 4/2004 | Ferrari et al. | |
| 2005/0148356 A1 | 7/2005 | Ferguson et al. | |
| 2005/0193113 A1 | 9/2005 | Kokusho et al. | |
| 2006/0271530 A1* | 11/2006 | Bauer | G06F 16/134 |
| 2008/0086616 A1 | 4/2008 | Asano et al. | |
| 2008/0126699 A1 | 5/2008 | Sangapu et al. | |
| 2008/0140883 A1* | 6/2008 | Salessi | G06F 13/1684 710/52 |
| 2008/0140905 A1 | 6/2008 | Okuyama et al. | |
| 2009/0077140 A1* | 3/2009 | Anglin | G06F 11/1469 |
| 2009/0222632 A1 | 9/2009 | Sasage et al. | |
| 2009/0228889 A1 | 9/2009 | Yoshida | |
| 2009/0249470 A1 | 10/2009 | Litvin et al. | |
| 2010/0037009 A1 | 2/2010 | Yano et al. | |
| 2010/0070725 A1 | 3/2010 | Prahlad et al. | |
| 2010/0191922 A1 | 7/2010 | Dickey et al. | |
| 2010/0312983 A1 | 12/2010 | Moon et al. | |
| 2011/0016450 A1* | 1/2011 | Karadakal | G06F 8/71 717/116 |
| 2011/0191554 A1 | 8/2011 | Sakai et al. | |
| 2012/0030318 A1 | 2/2012 | Ryder | |
| 2012/0030343 A1 | 2/2012 | Ryder | |
| 2012/0079221 A1 | 3/2012 | Sivasubramanian et al. | |
| 2012/0079505 A1 | 3/2012 | Tarta et al. | |
| 2012/0215835 A1 | 8/2012 | Takano et al. | |
| 2012/0246511 A1* | 9/2012 | Sato | G06F 11/2058 714/6.2 |
| 2012/0254687 A1 | 10/2012 | Leggette et al. | |
| 2012/0303576 A1 | 11/2012 | Calder et al. | |
| 2013/0007753 A1 | 1/2013 | Jain | |
| 2013/0036091 A1 | 2/2013 | Provenzano et al. | |
| 2013/0046966 A1 | 2/2013 | Chu et al. | |
| 2013/0054890 A1 | 2/2013 | Desai et al. | |
| 2013/0055248 A1 | 2/2013 | Sokolinski et al. | |
| 2013/0086585 A1 | 4/2013 | Huang et al. | |
| 2013/0104126 A1 | 4/2013 | Padmanabhuni et al. | |
| 2013/0198459 A1 | 8/2013 | Joshi et al. | |
| 2013/0268575 A1 | 10/2013 | Xu | |
| 2013/0304903 A1 | 11/2013 | Mick et al. | |
| 2014/0136482 A1 | 5/2014 | Rochette | |
| 2014/0181046 A1 | 6/2014 | Pawar et al. | |
| 2014/0280441 A1 | 9/2014 | Jacobson et al. | |
| 2014/0351636 A1 | 11/2014 | Yin et al. | |
| 2014/0359130 A1 | 12/2014 | Southern et al. | |
| 2015/0128053 A1 | 5/2015 | Bragstad et al. | |
| 2015/0134615 A1 | 5/2015 | Goodman et al. | |
| 2015/0134723 A1 | 5/2015 | Kansal et al. | |
| 2015/0139168 A1 | 5/2015 | Zhi et al. | |
| 2015/0160885 A1 | 6/2015 | Hara et al. | |
| 2015/0286432 A1 | 10/2015 | Dain et al. | |
| 2015/0370483 A1 | 12/2015 | Schoebel-Theuer | |
| 2016/0026395 A1* | 1/2016 | Lee | G06F 11/3466 711/112 |
| 2016/0036938 A1 | 2/2016 | Aviles et al. | |
| 2016/0085651 A1* | 3/2016 | Factor | G06F 16/245 714/6.2 |
| 2016/0224244 A1 | 8/2016 | Gensler et al. | |
| 2016/0291889 A1 | 10/2016 | Dawson et al. | |
| 2017/0024764 A1 | 1/2017 | Mooser et al. | |
| 2017/0147243 A1 | 5/2017 | Kowalski et al. | |
| 2017/0192857 A1* | 7/2017 | Meiri | G06F 11/1461 |
| 2017/0222935 A1* | 8/2017 | Kalman | H04L 41/0893 |
| 2017/0237809 A1 | 8/2017 | Farinacci et al. | |
| 2017/0329528 A1 | 11/2017 | Wei et al. | |
| 2018/0173874 A1 | 6/2018 | Muttik et al. | |
| 2018/0329935 A1 | 11/2018 | Mugali | |
| 2018/0359336 A1* | 12/2018 | Chattopadhyay | G06F 11/2097 |
| 2019/0042636 A1 | 2/2019 | Sipka et al. | |
| 2019/0332269 A1 | 10/2019 | Greenwood et al. | |
| 2019/0347352 A1* | 11/2019 | Gochkov | G06F 11/2094 |
| 2020/0142596 A1 | 5/2020 | Greenwood et al. | |

OTHER PUBLICATIONS

"Amazon EBS API and Command Overview", downloaded Jul. 11, 2013 from dov.aws.amazon.com/AWSEC2/latest/UserGuide/ebs-api-cli-overview.html, p. 1.

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/ pp. 1-4.

Amazon S3 Storage Services Guide—Developer Guide (API Version Mar. 1, 2006). Can be accessed at http://docs.aws.amazon.com/AmazonS3/latest/dev/Welcome.html.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articlse/1667, pp. 1-7.

HP; Chris Hyser et al.; Autonomic Virtual Machine Placement in the Data Center; pp. 1-10, Feb. 26, 2008; HP Laboratories.

International Preliminary Report on Patentability issued in PCT/US2019/028320, dated Nov. 3, 2020.

NLP IP (https://iq.ip.com/discover search results) (Year: 2020).

Reich et al. 'VMTorrent: Scalable P2p Virtual Machine Streaming Dec. 10-13, 2012.

Search Report and Written Opinion issued in PCT/US2019/028320, dated Jul. 8, 2019.

SwinBrain. "Database Management System Introduction". Nov. 17, 2009. Also available at http://swinbrain.icl.swin.edu.au/wiki/Database_Management_Systems_Introduction.

VMware; Carl Waldspurger; Memory Resource Management in VMware ESX Server; pp. 1-24, Dec. 10, 2002.

Xia et al., Taming IO Spikes in Enterprise and Campus VM Deployment Jun. 2014.

\* cited by examiner

UTILIZING MUTIPLE SNAPSHOT SOURCES FOR CREATING NEW COPY OF VOLUME IN A NETWORKED ENVIRONMENT WHEREIN ADDITIONAL SNAPSHOT SOURCES ARE RESERVED WITH LOWER PERFORMANCE LEVELS THAN A PRIMARY SNAPSHOT SOURCE

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the data center resources, such as a data storage service, can receive and maintain information for transmission to client devices. In such applications, the data storage service can maintain service level requirements related to available storage and data transmission availability.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
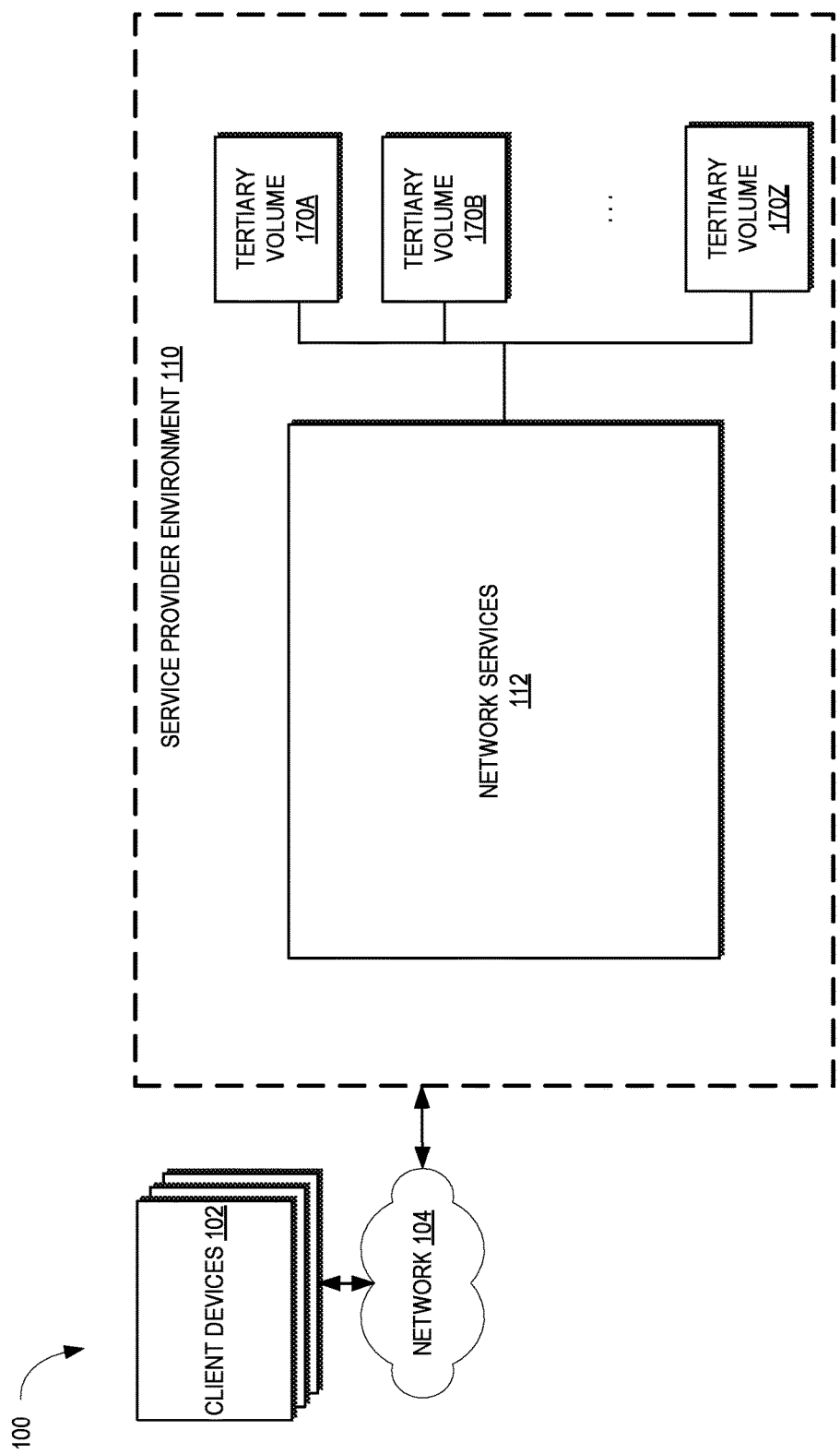
FIG. 1A is a block diagram depicting an illustrative environment in which a data service provider implements a data service including network services and a plurality of tertiary replicas support one or more network services.

Generally described, aspects of the present disclosure relate to leveraging highly distributed copies of data to increase efficiency in a distributed computing environment. In general, a volume can correspond to a logical collection of data, such as a set of data maintained on behalf of a user. For example, a virtual block store ("volume") can be used in conjunction with a virtual computing instance in order to support actions like booting from a machine image, running a database, writing logs, or performing data analysis. While such volumes may be presented as local block storage, they are actually network-attached and hosted on a separate hardware fleet in the substrate network of the distributed computing environment. When customers request volumes to be hosted within the distributed computing environment, the system may internally reserve physical resources for each volume, for example along the storage and performance dimensions.

In some embodiments, users of a storage service purchase storage services that include specification of available storage (e.g., density) and performance criteria regarding transmitting or receiving data. Based on the purchase, users can interact with the storage services (e.g., a volume) by a primary replica of storage data. The primary replica can be configured to facilitate reads and writes (sometimes referred to as "input output operations," or simply "I/O operations") at the volume, thus maintaining user experience with respect to the volume. Additionally, the service provider can also provide a secondary replica can be updated synchronously with the primary replica and provide for seamless transition during failover operations, for example if the computing hardware hosting the primary replica fails. The primary and secondary replicas are typically configured to provide low latencies with respect to user interaction, often with consideration of specific agreed upon service level requirements for availability and performance.

In allocating network storage components to meet the agreed upon sales, service providers will often factor variations in user service demand for the network services. More specifically, services providers can consider various aspects related to oversubscription of network storage services in maintaining volumes (e.g., primary and secondary replicas). In one example, a service provider can incorporate aspects of intelligent storage oversubscription in which available storage capacity or density can be effectively oversubscribed by observing what portion of purchased storage a customer volume actually uses. The service provider can the reserve or maintain storage volumes against the observed storage metrics (e.g., anticipated user patterns) rather than maintaining larger storage resources defined by sold storage.

While there have been dramatic improvements to the storage density of the drives used to host such volumes, for example through intelligent storage oversubscription, there have not been corresponding improvements to drive performance as measured by data throughput. More specifically, unlike storage density consumption, changes to input/output demands to storage volumes is more dynamic in nature and can grow and shrink much more quickly than storage demands. For example, assume a service provider provides or agrees to service level agreement specifying a performance parameter of 99% or higher compliance rates on IOPS (Input/Output Operations per Second) for volumes. Typically, individual customers would typically not require the maximum of performance parameters, such as IOPS performance allowance (e.g., the 99%), in consideration of the average access of data from the value. However, independent of average access patterns, one or more individual user data requests can peak to require the full performance parameter allowance without necessarily providing indication as to when such a request will occur or following patterns of behavior. Because of the more dynamic nature of some performance parameters, such IOPS performance allocation for access data from volumes, storage service providers may be limited in attempting to implement oversubscription models and are required to allocate and reserve storage resources to meet potential peak performance parameter allocations at all times.

The aforementioned problems, among others, are addressed in some embodiments by the disclosed techniques for leveraging highly distributed volume copies to support new volume creation. Illustratively, a distributed computing environment can select a set of highly distributed volume copies to support failover for primary volume by using the reserved performance resources among the set of highly distributed volumes that are currently unused. Beneficially, the disclosed techniques can provide a number of technical benefits, as described below. Volumes of data are typically replicated multiple times for fault-tolerance, for example as a primary and secondary (or master and slave) volumes that synchronously replicate and handle user input and output (I/O) operations. In one example, these primary and secondary volumes are each stored using up to sixteen different partitions, each of which may be stored on a different computing device, such as a server in a distributed computing environment.

To support failover of the primary and secondary volumes, in one approach, via a single, highly distributed tertiary replica of the volume, data is split into a much larger number of partitions (e.g., 100, 1,000, a million, or more) that are distributed for storage across a number of different computing devices. This single, highly distributed tertiary replica can serve as a read cache of volume data. This can provide for reduced latency in creating new copies of the volume (e.g., target volumes) by allowing the primary and secondary replicas to use their performance for user I/O while the tertiary replica supports target volume creation, and also takes advantage of the connection bandwidth of a large number of devices to transfer the data of the volume, rather than the smaller number of devices on which the primary replica or secondary replica is typically stored.

Generally, incorporation of a single, highly distributed volume copy can be leveraged to for improvements in hardware utilization for performance resources in a distributed computing system. The single, highly distributed volume can facilitate such performance efficiency increases by allowing the single, highly distributed volume to consume network parameters, such as IOPS, that have been reserved. In some implementations, the single, highly distributed volume can be created from a point-in-time snapshot copy of a volume, such that it operates to support creation of target volumes requested as copies of the snapshot in a more rapid manner than would be possible by using the snapshot itself (referred to herein as an "accelerated snapshot"). However, in scenarios with a single, highly distributed volume copy (e.g., a single tertiary replica), the individual tertiary replica may be required to be provisioned with sufficient resources to meet network parameter requirements, such as IOPS performance parameters, in providing the snapshot data in the event of a failure associated with the primary and secondary volumes that require repopulation of the requested data.

In accordance with aspects of the present application, the distributed computing system can incorporate a set of widely replicated tertiary replicas (e.g., 3, 5, 10, 20, or more replicas) that are configured to support the primary and secondary volumes. Individual tertiary replicas in the set of tertiary replicas may be provisioned with performance reserved at the expected average instead of the peak or independently of the reserved performance. In this embodiment, even though no each highly distributed volume in the set of tertiary replicas may have the available performance parameters, such as IOPS, CPU utilization, memory, to serve a target volume (e.g., a primary or secondary replica), there is a high probability that at least one will. Accordingly, the distributed computing system can consider various attributes of individual tertiary replicas (e.g., performance parameters or characteristics) in the selection of the set of tertiary replicas that maintain the snapshot data to support the primary and secondary volumes. Still further, the distributed computing system can utilize attributes in the selection of which of the tertiary replicas of the determined set of tertiary replicas will be utilized to process requests for the snapshot data to support a failover in a primary or secondary volume.

To illustrate, consider the example of an accelerated snapshot that must support 64 k IOPS of targets. If the system provisions a single tertiary replica to support copying snapshot data in a target volume in the event of a failover event, the system must reserve 64 k IOPS for each partition of the distributed volume that is distributed in the tertiary replica. More specifically, the distributed system must be configured such that the single tertiary replica can support a read data request for each of the distributed portions (e.g., each partition) of the tertiary replica at the required IOPS rate at all times. However, in accordance with an aspect of the present application, the distributed system provisions a set of tertiary replicas (e.g., a set of individual highly distributed volumes) that each function as potential sources for snapshot data in the event of a failover event. For any portion of the data in the primary and secondary volumes, the system could reduce the performance reservation at individual tertiary replicas in the set of tertiary replicas, under the principle that there is a high likelihood that the sum of available performance parameters across the distributed set of tertiary replicas is sufficient to satisfy the required IOPS service levels. For example, at different points in time, individual tertiary replicas may experience IOPS contention such that these individual tertiary replicas cannot provide data in accordance with the established IOPS thresholds. During such points of time, the primary or secondary volumes would look to different tertiary replicas that may not be experiencing the same IOPs contention.

As described above, the set of tertiary replicas can provide the ability to load balance target reads to individual tertiary replicas with agility. For example, a control plane that coordinates operations within the distributed computing system can select and distribute target sources based on target count or aggregate load against each highly distributed replica source. This can improve the reactivity of load balancing by informing a target volume about a set of tertiary replicas source candidates during target creation. A target volume (e.g., a primary or second volume) can select between various available tertiary replicas sources based on current resource loads at individual tertiary replicas, or could even distribute read load against multiple tertiary replicas using a probabilistic model like Boltzmann. In some embodiments, the control plane can also provide individual target volumes with a simplified or filtered subset of the set of available tertiary replicas that simplifies failover processing. With regard to failover, if a particular tertiary replica becomes unhealthy or overloaded it may simply signal to targets to request data from other tertiary replicas.

Further, in accordance with further aspects of the present application, the distribution and selection by the control plane of the distributed set of tertiary replicas include the selection of tertiary replicas having different physical or performance characteristics. In one embodiment, one or more tertiary replicas can be selected such that tertiary replicas have physical proximity to the target servers (e.g., in locations connected by short network paths). For example, by placing target volumes on the same rack that hosts portions of a set of distributed tertiary replicas, the system can copy the data from the distributed replica(s) to the new copy in-rack and avoid latencies associated with Tor traversal (e.g., bouncing network communications between relays for security reasons). Some implementations may even place a tertiary replica (or a portion of each of a set of tertiary replicas) on the same physical computing server as multiple target volumes to perform copy-on-write and de-duplicate common chunks across volumes.

Another benefit associated with one or more aspects of the present application relates to creation of additional read-only tertiary replicas that consume storage without requiring I/O reservations that are as high as the volumes that serve user I/O. For example, in the event of failure of one of the primary or secondary replicas, the system can issue a proactive remirror or elastic volume operation to create a new replica. In some scenarios, it can take hours or even days for the replication to complete. The slowness of volume migration results in a lack of performance fungibility, which in turn limits the ability to oversubscribe performance for these volumes. In some implementations it is not the write I/O that is hard to migrate, but the read I/O. To illustrate, a new target volume is immediately able to serve writes, but there may be read penalties if data written and acknowledged by the previous geometry (e.g., the hardware supporting a volume copy) is not local to the new storage nodes. More widely replicating volume data enables, for example to one or more highly distributed copies that act as "standby replicas" of the primary/secondary replica pair, enables a move write load onto different storage servers without paying the fault penalty. To avoid latency impact on writes, some implementations can use asynchronous replication to one or more standby replicas. Even though the standby replicas are not fully up-to-date or blessed, opportunistic replication of volume data to them can turn an hours- or days-long failover process into one that takes seconds or minutes. This is another case where the system can consume additional storage (and non-peak I/O) to address and utilize performance that is currently not usable.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only, and are not intended to be limiting. For example, while embodiments are disclosed herein with reference to "tertiary" replicas, this term is utilized solely for illustrative purposes, with the assumption that the replica is introduced into a system including primary and secondary replicas that function as the primary source of data for data requests. However, embodiments of the present disclosure may include any number of replicas (e.g., n replicas) such that more or fewer of the illustrated replicas (e.g., the primary and secondary replicas) function as the primary source of data for data requests. Thus, references to a primary or secondary replica, as used herein, should be understood to refer generally to an example of a replica (with a volume split between, for example, 1 and 16 replicas, or a number of replicas such that tail latency is not expected to significantly impact responsiveness of standard user I/O operations). As discussed below, such a highly-partitioned replica may include a number of partitions sufficient to enable rapid implementation of intensive I/O operations, such as duplication of an entire volume. This number of partitions may be, for example, between 100 and millions of partitions.

FIG. 1A is a block diagram of an illustrative operating environment 100, including one or more client devices 102 that may interact with a service provider environment 110 over a network 104. Client devices 102 may include a variety of computing devices enabling a user to communicate with the service provider environment 110. In general, the client devices 102 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. The service provider environment 110 may provide the client devices 102 with one or more user interfaces, command line interfaces (CLI), application programing interfaces (API), and/or other programmatic interfaces for interacting with the service provider environment 110 to request data from the service provider environment 110.

The client devices 102 and service provider environment 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. In some instances, communications between the client devices 102 and service provider environment 110 may be encrypted, such as via Transport Layer Security cryptographic protocol.

The service provider environment 110 can include a set of network services 112 available to customers/users of the service provider environment 110. An illustrative embodiment of components included in the network services 112 will be described with regard to FIG. 1B. The service provider environment 110 further includes a plurality of tertiary volumes 170170A-170Z, which are described in further detail with respect to FIG. 1C.

The service provider environment 110 is depicted in FIG. 1A as operating in a distributed computing environment including several computer systems that are interconnected using one or more computer networks (not shown in FIG. 1A). The service provider environment 110 could also operate within a computing environment having a fewer or greater number of devices than are illustrated in FIG. 1A. Thus, the depiction of the service provider environment 110 in FIG. 1A should be taken as illustrative and not limiting to the present disclosure. For example, the service provider environment 110 or various constituents thereof could implement various Web services components, hosted or "cloud" computing environments, or peer to peer network configurations to implement at least a portion of the processes described herein.

Further, multiple aspects of the service provider environment 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 1B:
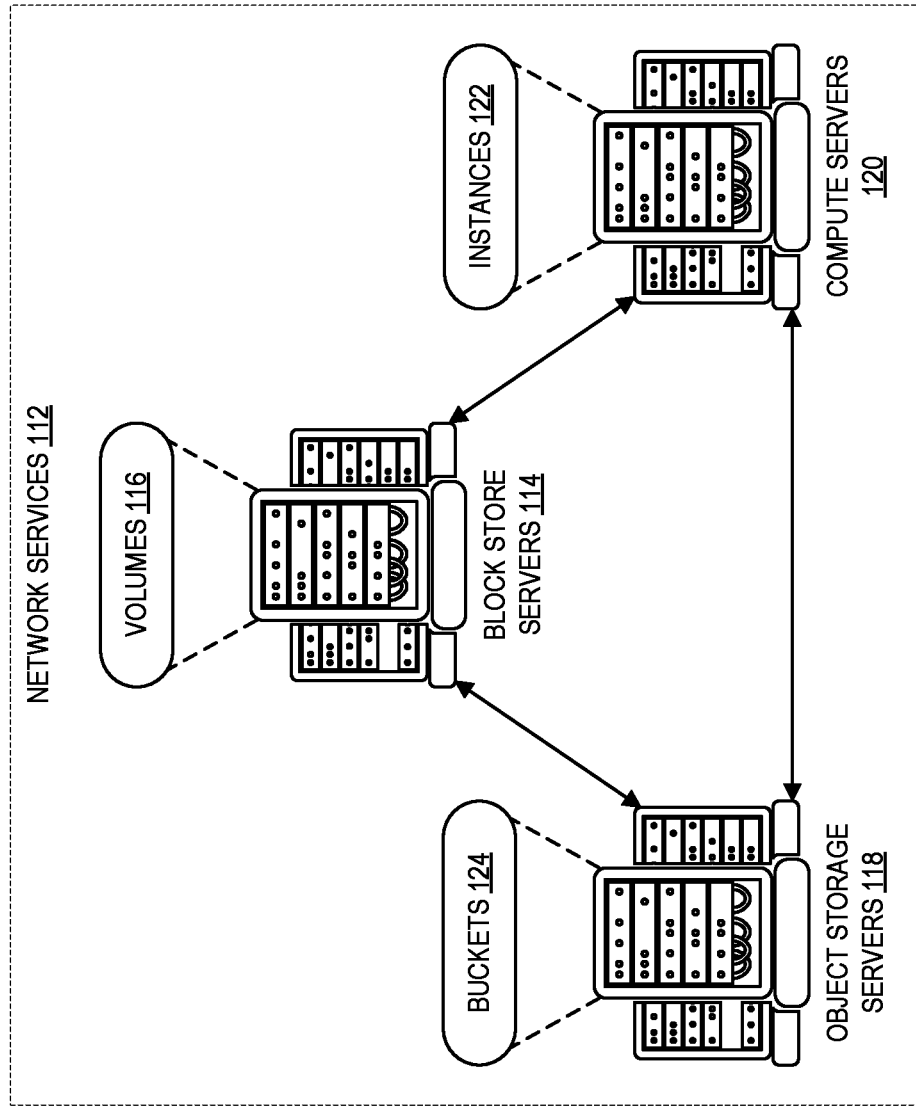
FIG. 1B depicts an illustrative set of components associated with network services for implementation of volumes, instances and replicas.

FIG. 1B depicts an illustrative set of network services 112 in which the disclosed set of tertiary replicas can be implemented. The network services 112 includes one or more compute servers 120, one or more object storage servers 118, and one or more block store servers 114 that are in networked communication with one another and with the network 104 to provide users with on-demand access to computing resources including instances 122, volumes 111, and buckets 124, among others. These particular resources are described in further detail below. Some implementations of network services 112 can additionally include domain name services ("DNS") servers, relational database servers, and other server configurations (not illustrated) for supporting on-demand cloud computing platforms. Each server includes hardware computer memory or processors, an operating system that provides executable program instructions for the general administration and operation of that server, and a computer-readable medium storing instructions that, when executed by a processor of the server, allow the server to perform its intended functions.

The network services 112 can provide on-demand, scalable computing platforms to users through the network 104, for example allowing users to have at their disposal scalable "virtual computing devices" via their use of the compute servers 120, object storage servers 118, and block store servers 114. These virtual computing devices have attributes of a personal computing device including hardware (various types of processors, local memory, random access memory ("RAM"), hard-disk, or solid state drive ("SSD") storage), a choice of operating systems, networking capabilities, and pre-loaded application software. Individual virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The network services 112 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the compute servers 120, object storage servers 118, and block store servers 114. The data centers within an availability zone and the availability zones within a region are connected to one another through private, low-latency links, for example fiber optic network cables. This compartmentalization and geographic distribution of computing hardware enables the network services 112 to provide fast service to users on a global scale with a high degree of fault tolerance and stability. To distribute resources evenly across the zones in a given region, the provider of the network services 112 may independently map availability zones to identifiers for each user account.

Turning specifically to the roles of the different servers within the network servers 112, the compute servers 120 include one or more servers on which provide resizable computing capacity to users for building and hosting their software systems. Users can use the compute servers 120 to launch as many virtual computing environments, referred to as instances 122, as they need. Instances 122 can have various configurations of processing power, memory, storage, and networking capacity depending upon user needs. The compute servers 120 can also include computer storage for temporary data used while an instance is running, however as soon as the instance is shut down this data is lost.

The block store servers 114 provide persistent data storage for the compute servers 120 in the form of volumes 116.

The block store servers 114 include one or more servers on which data is stored in as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data can be, for example, 512 bytes, 1 kilobyte ("kB"), 4 kB, 8 kB, 16 kB, 32 kB or larger, depending upon the implementation. The partitions of the tertiary replica can be the size of one block or of multiple blocks. For example, the partitions of the tertiary replica can be sized as a number of blocks equal to the size of the minimum storage unit used by the object storage servers 118, or the number of blocks that maximizes throughput to the object storage servers 118. For example, where the object storage servers 118 implement a minimum storage unit of 1000 blocks (e.g., 1 megabyte of data when blocks are 1 kB in size), each partition of a tertiary replica may be 1000 blocks (1 megabyte) in size. In contrast, typical partitions of the primary and secondary replicas range from 8 gigabytes ("GB") to 62.5 GB (or greater) in size, depending for example upon the size of the user volume.

Volumes 116 can be treated as an individual hard drive ranging for example from 1 GB to 1 terabyte ("TB") in size, and are made of one or more blocks stored on the block store servers 114. Although treated as an individual hard drive, it will be appreciated that a volume may be stored as one or more virtualized devices implemented on one or more underlying physical host devices. Volumes 116 may be partitioned a small number of times (e.g., up to 16) with each partition hosted by a device of the network services 112 that has the ability to transfer data. These volumes provided persistent, dedicated storage that can be attached to particular instances of the compute servers 120. Each volume may be attached to a single instance running on a compute server 115, and can be detached from that instance and re-attached to another. As described in more detail with respect to FIG. 1C, the block store servers 114 have built-in redundancy for volumes by replicating the volume across multiple servers within an availability zone, which means that volumes will not fail if an individual drive fails or some other single failure occurs.

The object storage servers 118 represent another type of storage within the elastic computing environment 120. The object storage servers 118 include one or more servers on which data is stored as objects within resources referred to as buckets 124. Each object typically includes the data being stored, a variable amount of metadata that enables various capabilities for the object storage servers 118 with respect to analyzing a stored object, and a globally unique identifier or key that can be used to retrieve the object. Objects stored on the object storage servers 118 are associated with a unique identifier, so authorized access to them can be obtained through requests from networked computing devices in any location. Each bucket is associated with a given user account. Users can store as many objects as desired within their buckets, can write, read, and delete objects in their buckets, and can control access to their buckets and the contained objects. Further, in embodiments having a number of different object storage servers 118 distributed across different ones of the regions described above, users can choose the region (or regions) where a bucket is stored, for example to optimize for latency. Users can use object storage servers 118 for purposes such as storing photos on social media websites, songs on music streaming websites, or files in online collaboration services, to name a few examples. Applications developed in the cloud often take advantage of object storage's vast scalability and metadata characteristics. The object storage servers 118 can support highly parallel data accesses and transfers.

The object storage servers 118 can offer even greater redundancy than the block store servers 114, as the object storage servers 118 can automatically replicate data into multiple availability zones. The object storage servers 118 also have different data throughput than the block store servers 114, for example around 20 Mbps for a single stream of data. While the object storage servers 118 can be used independently from the instances and volumes described above, they can also be used to provide data backup as described below with respect to snapshots (e.g., object-stored backups of volume data).

The network services 112 can communicate over network 104 with user devices 130. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User devices 130 can include any network-equipped computing device, for example desktop computers, laptops, smartphones, tablets, e-readers, gaming consoles, and the like. Users can access the network services 112 via the network 104 to view or manage their data and computing resources, as well as to use websites and/or applications hosted by the network services 112.

Users can instruct the network services 112 to create snapshots of their volumes stored on the block store servers 114. In one embodiment, a snapshot is a point-in-time block-level backup of the volume, stored as a copy of data on the volume on one or more of the object storage servers 118 (e.g., as a single object or a collection of objects). In addition to, or as an alternative to, managing snapshots through general interfaces for the object storage servers 118, snapshots may be managed through the application programming interface ("API") of the block store servers 114. In one example, snapshots are implemented as incremental records of data within a volume. Illustratively, when the first snapshot of a volume is taken, all blocks of the volume that contain valid data are copied as one or more objects to the object storage servers 118, and then a snapshot "table of contents" or "manifest" file is written to the object storage servers 118 that includes a record of the one or more objects, as well as the blocks of the volume to which each of the one or more objects correspond. Due to the use of incremental snapshots, when the subsequent snapshots are taken of the same volume, only the blocks that have changed since the first snapshot need be copied to the object storage servers 118, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume at the time of the initial snapshot, or snapshots from subsequent time points can be combined together or with the initial snapshot to reconstruct the entire volume at any individual subsequent point in time. In this way snapshots can serve as both incremental backups and a full backup of a given volume.

When creating a snapshot, any data written to the volume up to the time the snapshot is started can be included in the snapshot, and users can continue to perform I/O operations to their volumes during snapshot creation without affecting the snapshot. Users can create a new volume from a snapshot, for example to create duplicates of their volumes or to restore data. The new volume will contain all the data stored in the snapshot and thus will be a duplicate of the original volume at the time the snapshot was started. In this manner, snapshots can also be used to transfer a volume's data from one availability zone to another. Similarly, snapshots can be taken of instances to create a new virtual machine instance of that instance.

Figure 1C:
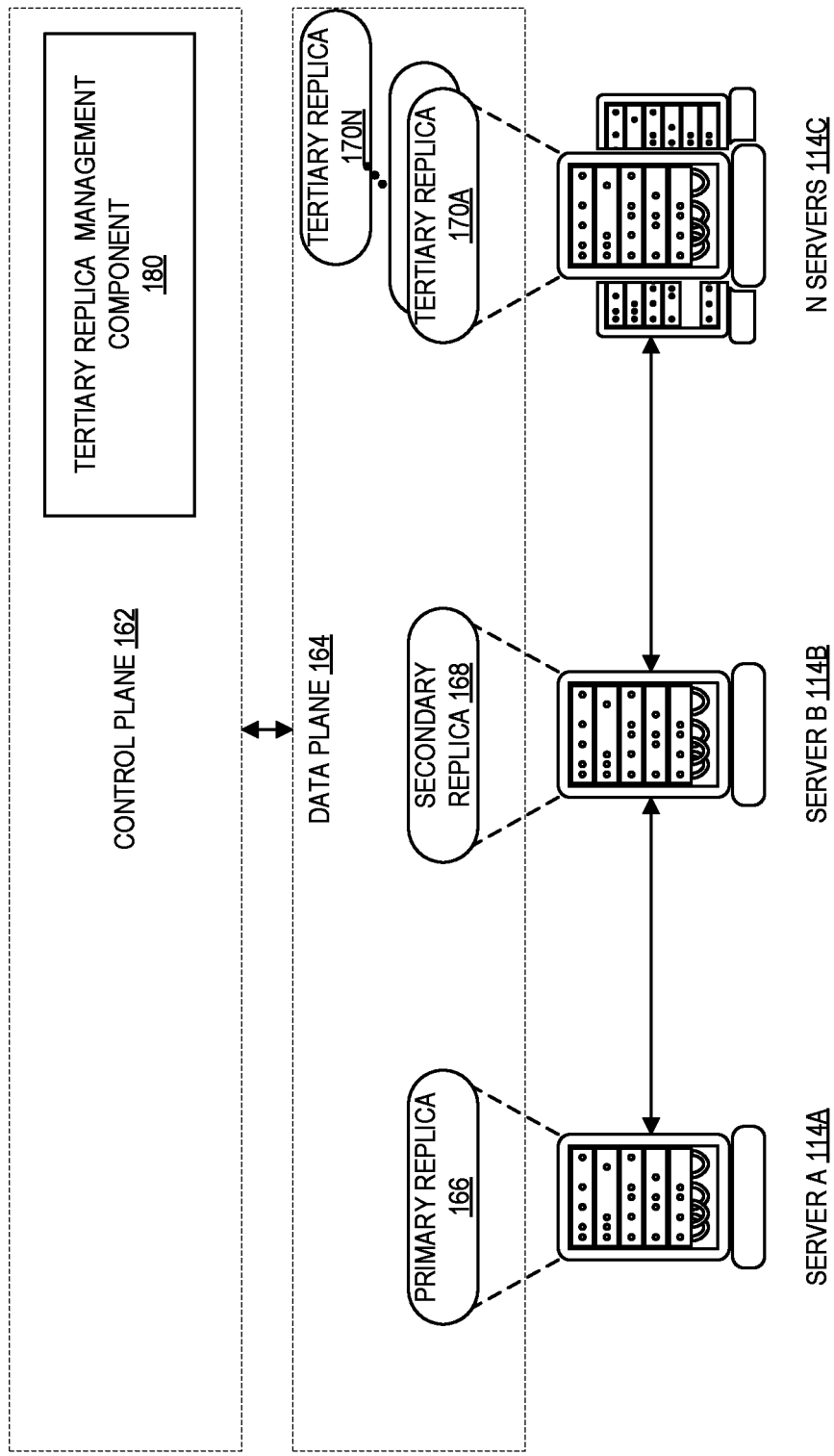
FIG. 1C depicts an example of how the block store servers can be configured to store I/O handling replicas and a set of read-only replicas of a volume according to embodiments of the present application.

FIG. 1C depicts an example of how the block store servers 114 can be configured to store primary, secondary, and a set of tertiary replicas of volumes 170, according to embodiments of the present disclosure. The block store servers 114 are configured to mirror the content of block devices between servers 105 and synchronously replicate data across redundant servers. FIG. 1C also depicts a data plane 150 and a control plane 162 of the network services 112. The data plane 150 represents the movement of user data through the network services 112, while the control plane 162 represents the movement of control signals through the network services 112. One skilled in the art will appreciate that the data plane 164 and control plane 162 represent logical constructs related to the operation of servers 105, rather than a physical configuration of the servers 105.

The control plane 162 is a logical construct that can be implemented by at least one server with computer-executable software for coordinating system and user requests and propagating them to the appropriate servers in the network services 112. Functions of the control plane 162 include replication of data, failover operations, and receiving requests from users for specific actions to be performed with respect to the data plane 164. For purposes of illustration, in one embodiment, the management of the selection of tertiary replicas 170A-N can be controlled with regard to implementation of a tertiary replica management component 180. Illustrative components of a tertiary replica management component 180 will be described with regard to FIG. 3. These can include determining how many tertiary replicas to create for particular volumes 116, where to place such tertiary replicas (e.g., how to distribute portions of the data across different servers), and which tertiary replica(s) to use when creating new copies of the volumes. The data plane 164 in the illustrated embodiment is implemented by execution of operations on the primary replica 166, secondary replica 168, and tertiary replicas 170A-N. As described above, certain examples and embodiments described herein focus, for the purpose of illustration, on an example system that implements two replica volumes in conjunction with a set of tertiary replicas. However, embodiments of the present disclosure may include more or fewer I/O handling replicas of the volume, and any number of additional read-only replicas.

As described above, user I/O operations can be executed at the primary replica 166, with a block-level replication mechanism replicating the information synchronously with a secondary replica 168. The primary replica 166 and secondary replica 168 can be provisioned on different block store servers 114A, 114B for heightened data integrity. Though the servers 114A and 114B are each depicted as a single server, in some implementations the primary replica 166 and secondary replica 168 may each include a number of partitions, and each partition may be stored on a different server. Both the primary and secondary replicas of the volume can have installed a block level replication mechanism that allows any I/O operation to the primary replica 166 to be replicated to the secondary replica 168. Various mechanisms for providing synchronous I/O operations to a volume across multiple replicas are known in the art, and thus will not be described in detail herein. Any failure or outage of the primary replica 166 can be addressed by performing a failover operation to the secondary replica 168. A DNS name or other such approach can be used such that the name can be aliased to the secondary replica 168 during a failover, such that there is no action needed on the part of the user to utilize the "new" primary replica. Alternatively, a server hosting an instance that is attached to the primary replica can have stored in memory the IP address of the volume, volume ID, or other identifying data to connect to the secondary replica or the IP address of a control plane system that can provide the aforementioned data in the event a failover occurs. The provisioning of the replicated volume and creation of new volumes can be controlled by the control plane 162.

The primary and secondary replicas can illustratively be partitioned into a maximum of 16 partitions. Generally described, partitioning is the creation of one or more regions on computer storage so that an operating system can manage information in each region separately, with each partition being as a distinct "logical" storage device that uses part of the physical computer storage. Each partition may be hosted by a distinct device of the network services 112 and have a functional data transfer limit up to the computing resources available to the host device on which the partition is implemented. For example, where a partition is hosted on a physical device with a 1 gigabytes per second ("Gbps") network interface, the partition may have a functional data transfer limit of 1 Gbps (or less, in instances where the host device hosts multiple partitions which must be sent over the network interface at the same time). As described above, this functional data transfer limit results in latencies for certain user actions that require significant transfer out of the data of the volume, particularly for large volumes of data. For example, a user may create many clones of an instance and may also wish to clone the associated volume to attach to each new instance. This can be beneficial, as an example, where a user volume includes real-time market data, and the user desires to run a thousand experiments testing different algorithms for analyzing the data and push out the best algorithm by the next trading day. Such experiments are conducted on the basis of software residing within a volume, and thus cloning the volume to 1000 machines allows the experiment to run. It will be appreciated that this is just one illustrative example of a user need for creating a large number of clones within a short timeframe. The data transfer bandwidth of the primary and secondary replicas is limited by the functional data transfer limit of the source devices on which the partitions are hosted, and the control plane 162 also may reserve some of this bandwidth to support I/O operations at the primary replica 166 and synchronous replication of blocks to the secondary replica 168 (e.g., such that standard user I/O operations may continue during a cloning operation).

In contrast, individual tertiary replicas 170 can be split into a larger number of partitions than the number of partitions of the primary and secondary replicas. In some embodiments, this number can range from 1,000 partitions to 32 million partitions (e.g., one partition per volume block). In some embodiments, lower numbers of partitions can be used for the tertiary replica, for example a certain number that enables an entire volume to be cloned or snapshotted within a threshold period of time. In this example, bandwidth of network interfaces, bandwidth to the object store, size of the volume, and a target completion time can be used to determine the number of partitions to use. Beneficially, the increased number of partitions increases the total available bandwidth for transferring the data of the tertiary replica. Each partition can include one or more blocks of the volume, and these partitions can be stored in containers at different devices of the network services 112. In an embodiment, a container stores raw unstructured binary files, for example binary large object ("BLOB") data files, and returns them back when queried. The control plane 162 can divide the data of a volume (e.g., as stored in a primary or secondary replica) into individual partitions, each of which may be stored on any container in the network services 112 (or a designated region or availability zone thereof) that has capacity. These containers can be append-only and can be sealed once the storage space of the container is fully used (e.g., any remaining portion of storage is too small to store another partition of a tertiary replica). For redundancy, in some implementations the container servers can be configured with computer-executable instructions to replicate multiple copies of the containers.

The tertiary replicas 170A-170Z represent a set of additional replicas that are available for use in reading data of the volume, for example to support creation of new copies of the volume without taxing the resources allocated to the read-write replica set. These additional replicas are referred to in some places in this disclosure as "tertiary" replicas based on the example model of maintaining primary and secondary replicas for handling I/O to the volume, however this is not intended to limit their usage to a two-replica system, nor to limit their usage to only a third replica (as the additional replicas themselves may be replicated). The additional replicas may not handle I/O to the volume, but instead may be maintained as read-only resources for use in the creation of new copies of the volume. In some implementations, the additional replicas may be copied directly from an I/O handling replica of the volume. In some implementations, the additional replicas may be copied from snapshot data captured as a point-in-time backup of the volume. Some implementations may maintain the additional replicas as static, point-in-time copies of the volume, while other implementations may update the additional replicas (synchronously or asynchronously) with the I/O handling replicas. Thus, as used herein a "replica" of a volume refers to another occurrence of that volume in its updated form or as it was at a particular time (and may share the ID of the volume and/or snapshot used to create the replica), while a "copy" of the volume refers to a new volume created by copying the data of the volume (for example using an additional replica as a source). Such copies may begin to diverge from the original source volume, for example as a result of continued I/O to the copy.

Individual tertiary replicas 170 can be considered as a resource within the network services 112 to accelerate snapshotting and cloning of volumes. The tertiary replicas 170A-N beneficially reduce bottleneck on multi-tenant servers in the elastic computing environment 120, where one user may, for example, request to make 1,000 clones of their volume and use up the connection bandwidth of the server to the detriment of other users. In one embodiment, a tertiary replica might not be exposed directly to users, though it may be configured to support their snapshotting and cloning requests. Some embodiments may maintain multiple copies of the tertiary replica, for example to support feeding the creation of multiple new volumes in parallel. The distributed storage of the tertiary replicas 170A-N provides a number of benefits, including taking advantage of the high parallelism but low throughput connections to buckets on the object storage servers 118, as well as being able to drive high throughput on the block store servers 114. As will be described in greater detail below, in one embodiment, the tertiary replica management component 180 can configured a set of tertiary replicas 170 to support the primary and secondary volumes 166, 168.

Figure 2:
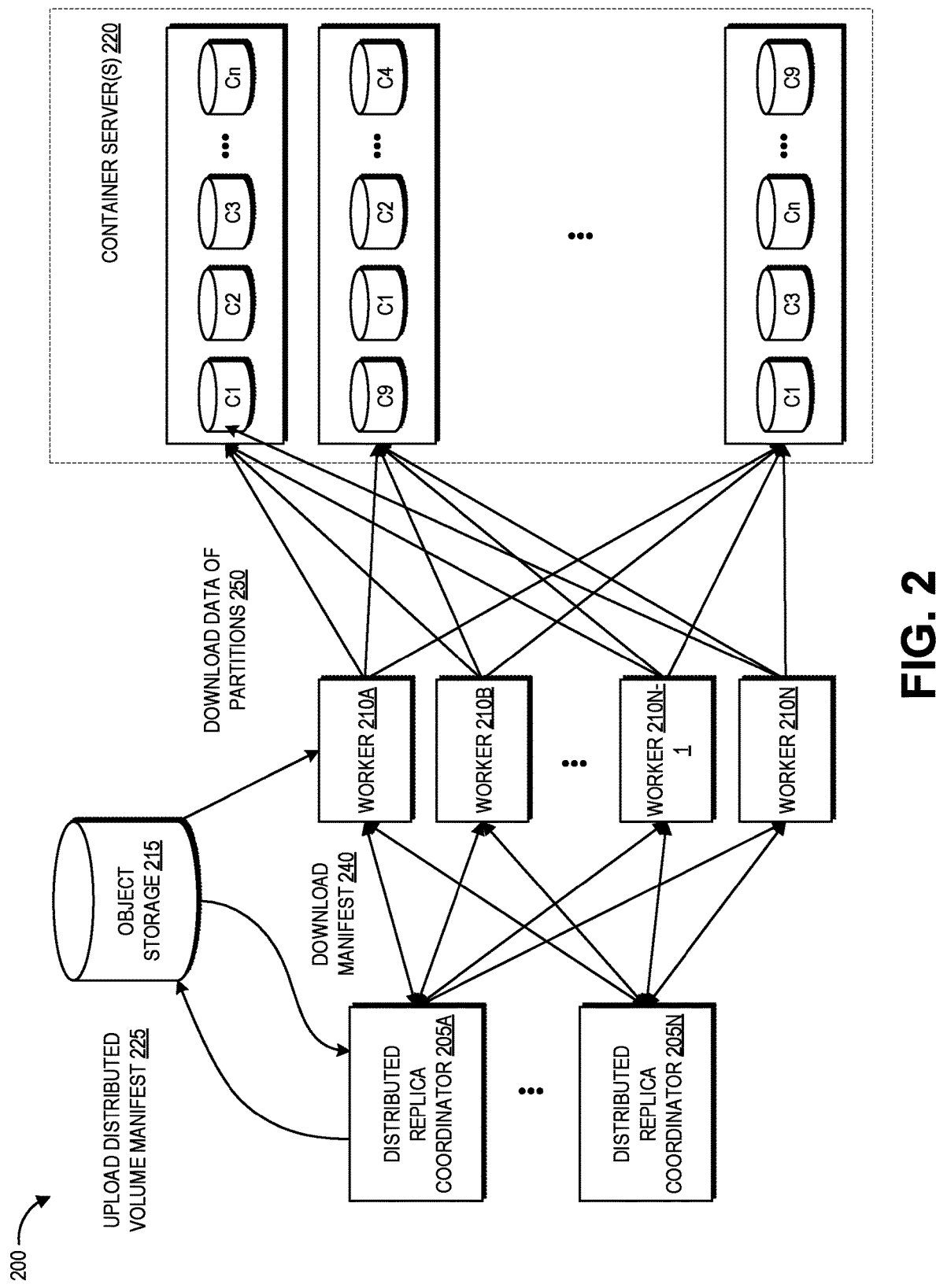
FIG. 2 depicts a schematic diagram of creating a distributed tertiary replica within the service provider environment of FIG. 1A.

FIG. 2 depicts a schematic diagram 200 of creating individual distributed tertiary replicas 170 within the network services 112, for example an implementation of a set of tertiary replicas 170 of FIG. 1C. The tertiary replica is not depicted in FIG. 2A as the partitions of this replica are stored in the containers C1-Cn. A "static" distributed tertiary replica refers to a tertiary replica that does not receive block-level updates, synchronously or asynchronously, from the primary or secondary replicas. Although this particular example can be created as a static distributed tertiary replica, in some embodiments this replica can later receive updates from the primary or secondary replicas, for example by connection to a logger fleet that propagates updates to the distributed replicas. Such a logger fleet can include a number of stateless workers that each download data to be stored in each partition (or a range of partitions) as directed by the distributed replica coordinator 205A, 205N. The distributed replica coordinator 205A, 205N and workers 210A-210N can be a data stream handling client, running for example as an instance on a compute server 120.

The object storage 215 can be one or more buckets of the object storage servers 118 described above that includes a snapshot of a volume. In the illustrated embodiment, the distributed replica coordinator 205A, 205N is the component that drives the creation of the distributed tertiary replica from snapshots stored in the object storage 215. Other embodiments can create the tertiary replica without reaching into the object storage 215, for example by creating it directly from the primary and/or secondary replicas.

There may be a number of distributed replica coordinators 205A, 205N, for example one per tertiary replica that is being updated by the logger fleet 315. Illustratively, the workers 210A-210N are a stateless worker fleet that downloads data to be stored in each partition (or a range of partitions) as directed by the distributed replica coordinator 205A, 205N. The distributed replica coordinator 205A, 205N and workers 210A-210N can be a data stream handling client, running for example as an instance on a compute server 115.

The workers 210A-210N store the tertiary replica partitions in containers C1-Cn on the container servers 220, for example selecting any container with capacity and directing a tertiary replica partition to the selected container. In the illustrated example each container is replicated across a number of the servers 220 for fault tolerance, however other implementations may not replicate the containers. Each container C1-Cn is essentially a partition of one of the container servers 220. Each container C1-Cn can have capacity to store a number of tertiary replica partitions. In one embodiment, each container C1-Cn includes an append-only key value store that stores key/values as long as it has capacity and returns the stored data on demand. Unlike the above-described volume partitions which belong to a single volume of a user, the containers C1-Cn can be multi-tenant in that they may store data from multiple volumes of different users.

The container servers 220 can be dedicated ones of the block store servers 114, or can be shared with block store servers 114 storing volumes described above. Although a snapshot stored in the object storage servers 118 can also be considered as a copy of the primary replica, each connection between the block store servers 114 and the buckets of the object store servers 118 is typically low throughput with high latency, while the elastic block store servers 114 within a given availability zone are typically connected with high throughput, low latency connections. Accordingly, by using the tertiary replica stored on the container servers 220 of the block store servers 114 instead of a snapshot stored on the object storage servers 118, the time required for transferring the data of an entire volume into a new volume can be reduced from hours to minutes.

Figure 3:
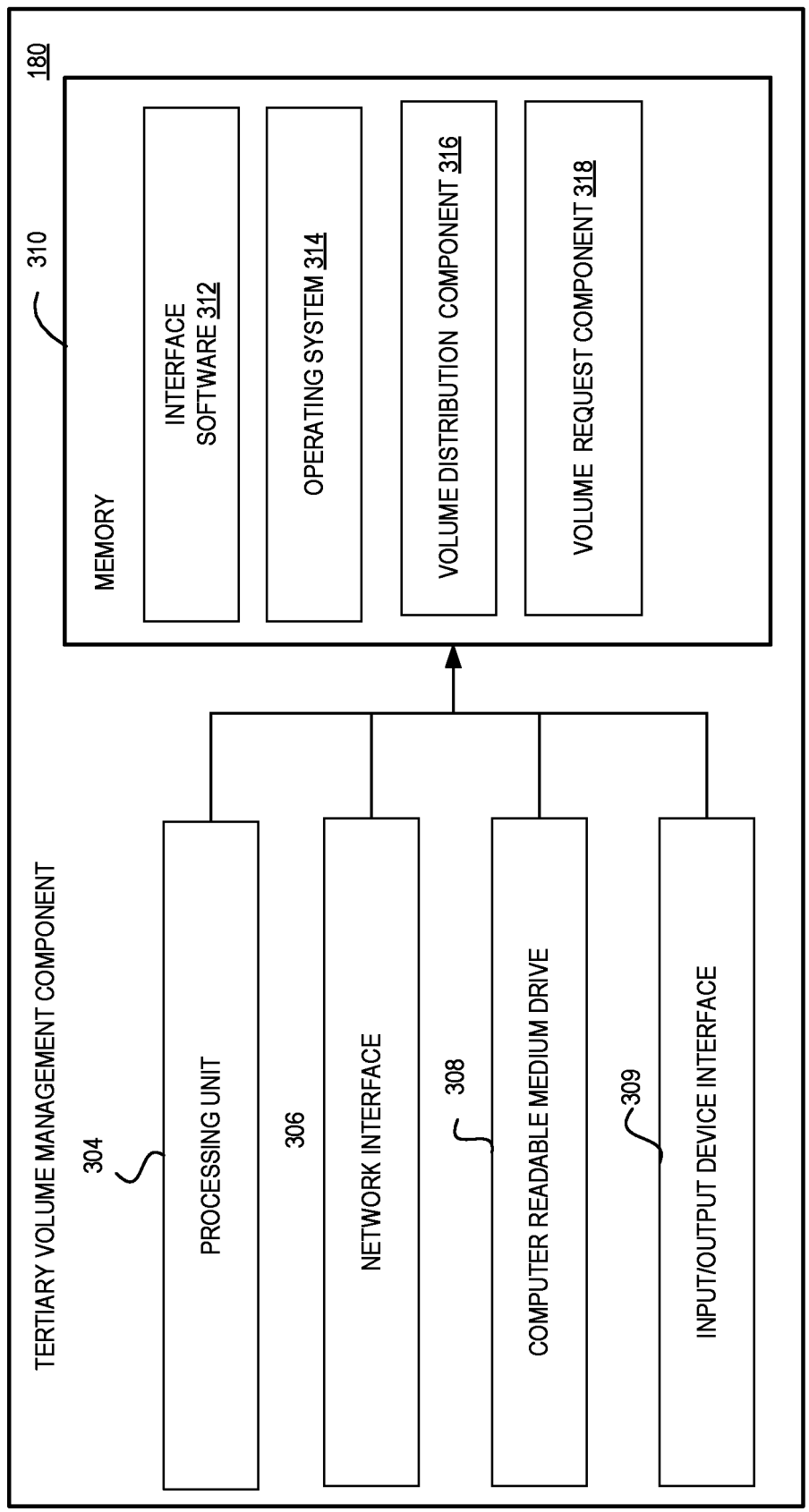
FIG. 3 depicts one embodiment of an architecture of an illustrative computing device for implementing various aspects of the tertiary replica management component in accordance with aspects of the present application.

FIG. 3 depicts one embodiment of an architecture of an illustrative computing device for implementing various aspects of the tertiary replica management component 180 in accordance with aspects of the present application. The tertiary replica management component 180 can be a part of the control plane 162.

The general architecture of the tertiary replica management component 180 depicted in FIG. 3 includes an arrangement of computer hardware and software components that may be used to implement aspects of the present disclosure. As illustrated, the computing device 124 includes a processing unit 304, a network interface 306, a computer readable medium drive 308, and an input/output device interface 309, all of which may communicate with one another by way of a communication bus. The components of the tertiary replica management component 180 may be physical hardware components or implemented in a virtualized environment.

The network interface 306 may provide connectivity to one or more networks or computing systems, such as the network of FIG. 1A. The processing unit 304 may thus receive information and instructions from other computing systems or services via a network. The processing unit 304 may also communicate to and from memory 310 and further provide output information. In some embodiments, the computing device 124 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the tertiary replica management component 180. The memory 310 may further include computer program instructions and other information for implementing aspects of the present disclosure. For example, in one embodiment, the memory 310 includes interface software 312 for receiving and processing commands related to the management tertiary replicas. Memory 310 includes a tertiary replica distribution component 316 for configuring or managing the determination of the distribution of tertiary copies for a set of target volumes. The memory 310 further includes a volume request component 318 for selecting particular tertiary replicas for use in copying data to particular new target volumes.

Figure 4A:
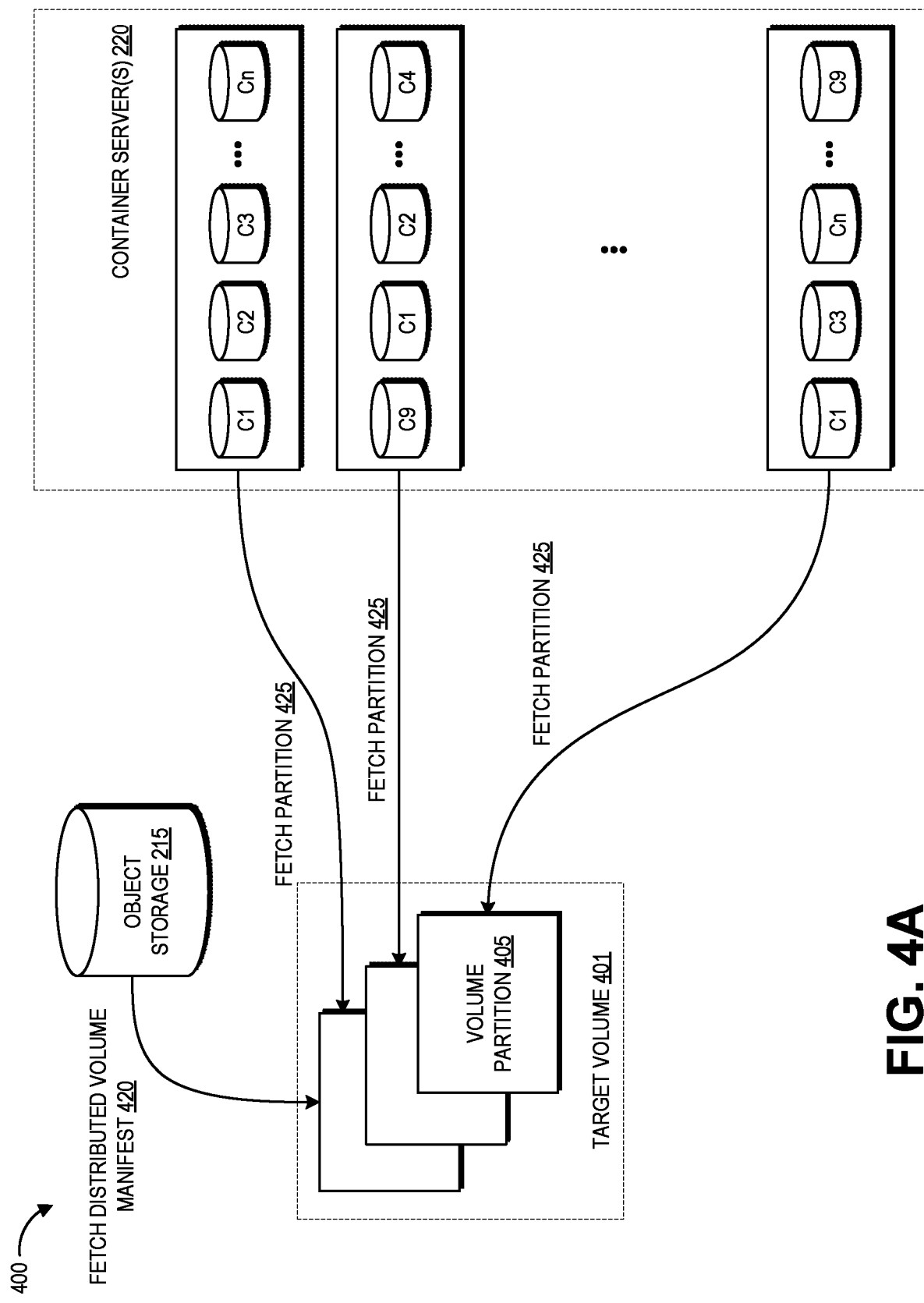
FIG. 4A depicts a schematic diagram of generating a new copy of a volume from a distributed tertiary replica within the environment of FIG. 1A.

FIG. 4A depicts a schematic diagram 400 of creating a clone of a volume from a distributed tertiary replica within the elastic computing system 120. As described herein, due to its highly distributed nature the tertiary replica supports a high degree of parallelism where many pieces of data of a given volume can be transferred simultaneously. The clone is created as target volume 401 that has a determined number of partitions 405 (its "geometry"). The partitions 405 can be stored on one or more of the block store servers 105 described above. Although the process described with reference to FIGS. 4A and 4B focuses on the techniques for using the data of a particular tertiary replica to create a new copy of a volume, it will be appreciated that the new copy of the volume may receive data from a number of different tertiary replicas in accordance with the disclosed techniques.

Figure 4B:
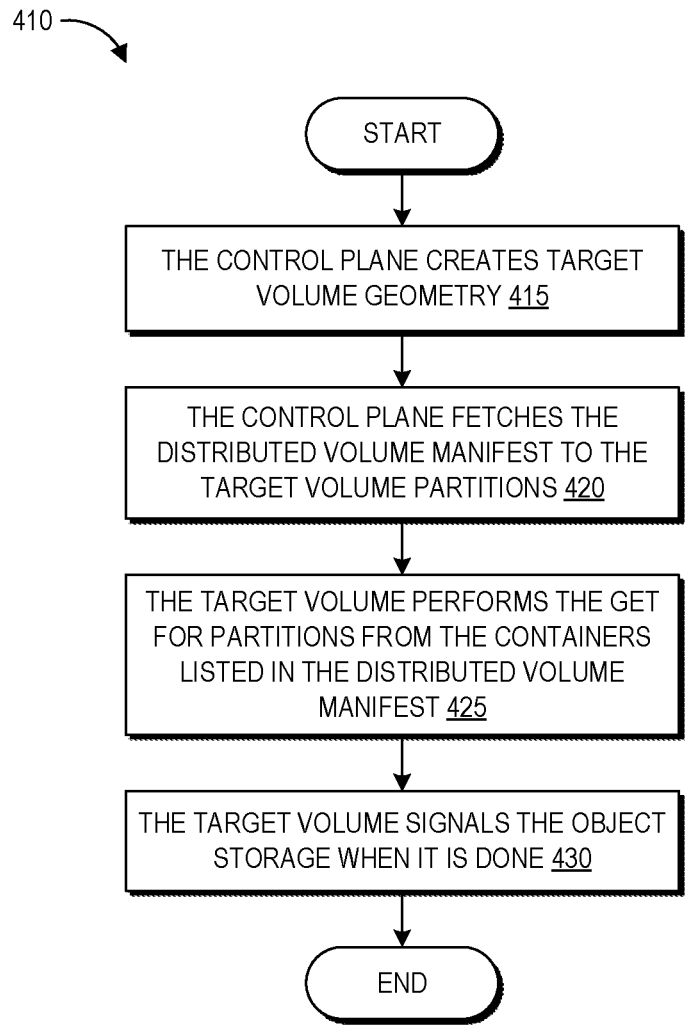
FIG. 4B is a flowchart of an example process for new volume generation from a distributed tertiary replica according to FIG. 4A.

Further explanation of the interactions of FIG. 4A will be described with reference to FIG. 4B. Specifically, FIG. 4B is a flowchart of an example process for clone creation of a new data volume (e.g., as a primary and secondary replica of the volume) based on information stored within a distributed tertiary replica according to FIG. 4A. The process 410 can be performed under control of the control plane 162 of the elastic computing system 120 in some embodiments.

At block 415, the control plane 162 creates a target volume 401 on the partitions 405. The target volume 401 refers to the new volume that will be created using the tertiary replica.

At block 420, the control plane 162 fetches the distributed volume manifest from object storage 215 and stores the manifest (or portions of the manifest) on the target volume partitions 405. As described above, the distributed volume manifest maps the partition-ID to the container-ID for each partition of the tertiary replica. In some implementations, each partition of the target volume 401 can be provided with a relevant subset of the distributed volume manifest identifying the container locations of tertiary-replica-partitions that will be written to the target volume partition.

At block 425, each partition of the target volume retrieves, from the relevant containers, the data of partitions listed in the relevant portion of the distributed volume manifest. If there is a "get" fault, that is, a user of the volume tries to access data of a partition that has not yet been retrieved to the target volume, then the target volume 401 can perform a get on to the container hosting that partition. FIG. 4A depicts a single fetch of a single partition of the tertiary replica to a corresponding partition 405 of the target volume 401, and such fetching could illustratively be repeated until each needed partition of the tertiary replica has been fetched. Although FIG. 4A shows a single arrow leading from each container server 220 to one of the partitions 405, it will be appreciated that this is for purposes of simplicity and clarity in the figure, and that each partition may receive data from a number of or all of the container servers 220. If a container is un-responsive, the target volume 401 can use the object storage manifest described with respect to FIGS. 2A and 2B to retrieve the data of the partition identified within the distributed volume manifest from object storage.

At block 425, the target volume 401 signals the object storage 215 when it is done creating the new volume.

Figure 5:
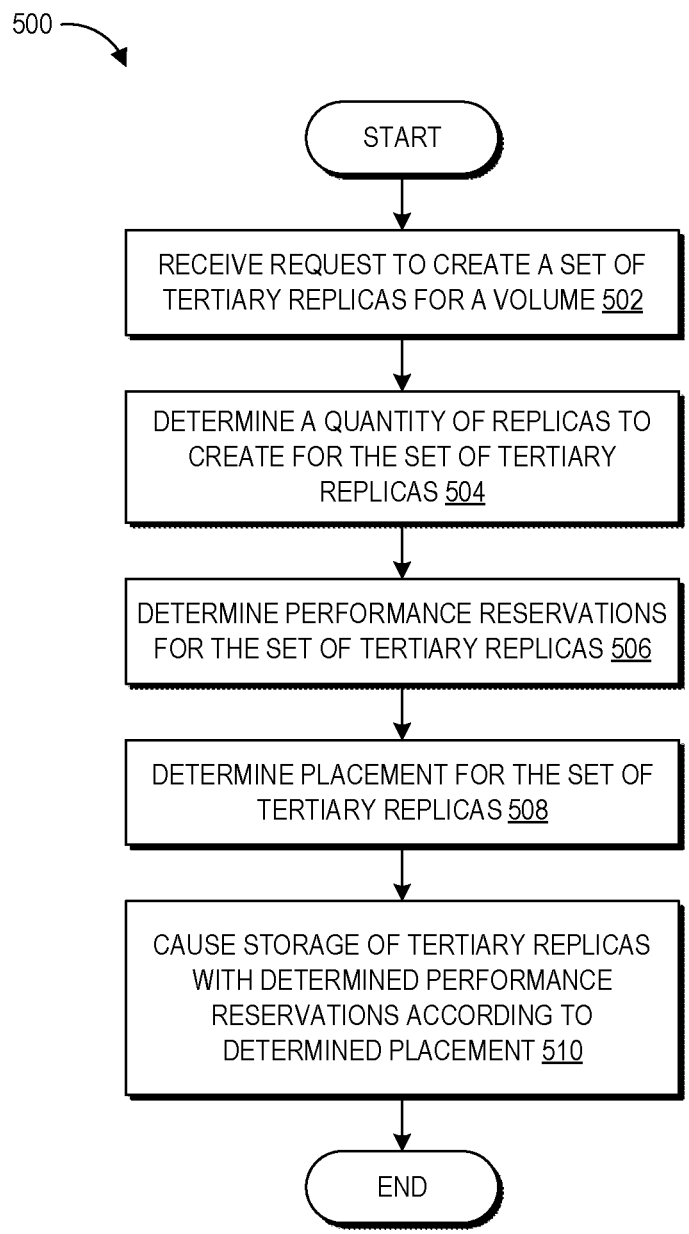
FIG. 5 is a flow diagram depicting an illustrative processing routine implemented to create and configure tertiary replicas of volumes in accordance with illustrative embodiments.

Turning now to FIG. 5, a routine 500 implemented by a tertiary replica management component 180 for creating and configuring tertiary replicas of volumes will be described. Routine 500 can occur during an initial configuration of the tertiary volumes, and some or all of the routine may be repeated if the set of tertiary volumes is updated (e.g., to add or remove tertiary volumes from the set). At block 502, the tertiary replica management component 180 can receive a request to create a set of tertiary replicas for a particular volume. In some implementations, this request may originate from the customer to whom the volume belongs. For example, the customer may wish to accelerate the creation of new copies of the volume, and can designate the volume or a particular snapshot of the volume for acceleration. This can trigger the routine 500 to create a set of tertiary replicas for use in supporting the creation of the new copies. In some implementations, this request may be issued by the control plane 162. The control plane 162 may in certain scenarios determine to create the set of tertiary replicas, for example in response to a request for a large number of copies of the volume, or as a feature for heightened volume redundancy.

At block 504, the tertiary replica management component 180 can determine a quantity of replicas to create for the set of tertiary replicas. The quantity may be specified in the request in some embodiments. In other embodiments, the quantity may be dynamically determined based on analysis of how setting different performance reservation levels for different numbers of replicas will impact the likelihood that any given tertiary replica will have a desired level of performance availability, when considering expected usage of reserved resources across the storage server fleet.

At block 506, the tertiary replica management component 180 can set the performance reservations for the set of tertiary replicas. As described above, for volume replicas that serve I/O it can be desirable to reserve a high percentage of the customer's expected maximum IOPS for the replica, so that the customer's desired performance is as guaranteed as possible. Despite high reservations (e.g., 99% or higher of maximum IOPS), customers generally do not use all of this performance allowance, but it is difficult to know if and when the customer will need their maximum performance, and as a result resources are set aside across the storage server fleet that often go unused. However, for read-only data copying resources such as the tertiary replicas, the tertiary replica management component 180 can set a lower level of performance reservations under the premise that at least one of these tertiary replicas is likely to be able to "soak up" this unused performance at any given point in time.

Accordingly, the level of performance reservation can be determined based at least partly on the number of tertiary replicas in the set. Specifically, the level of performance reservation can be inversely related to the number of replicas in the set, as replication of a block of data to more storage nodes increases the number of nodes available to serve reads for that block, and thus the likelihood that there is at least one node with sufficient unused capacity to handle the required read rate. The tertiary replica management component 180 can also use historical performance usage data to predict the likely usage across the storage fleet as a factor in the determination of tertiary replica performance reservation.

To illustrate, consider the example of an accelerated snapshot that must support 64 k IOPS of new target volumes. If a single tertiary replica is provisioned as the hydration source, the tertiary replica management component 180 should reserve 64 k IOPS for that single tertiary replica, or at least should not have a more aggressive reservation strategy than the target volume itself. But 100 tertiary replicas are provisioned as the hydration source, the tertiary replica management component 180 could reserve 100 IOPS each, under the premise that there is a high likelihood that the sum of available IOPS across those 100 tertiary replicas is enough to satisfy the target volume load. As such, wider replication allows the distributed system to consume more storage and less aggregate performance.

Although examples provided herein focus on the performance resource of IOPS, it will be appreciated that the disclosed techniques are equally applicable to other performance resources (or combinations of performance resources) including memory (e.g., RAM), network throughput, and processing resources (e.g., CPU).

At block 508, the tertiary replica management component 180 can determine placement for the set of tertiary replicas. For example, the tertiary replica management component 180 can determine which storage servers have available performance sufficient to meet the determined reservation, and may determine which of those storage servers have other I/O loads that will enable the tertiary replica to soak up unused capacity. Some implementations may implement other placement strategies, for example distributing the tertiary replicas to have substantially even spacing across the servers, or co-locating the tertiary replicas in a certain region of the network, depending upon requirements of the target volume load. In some implementations, the tertiary replica management component 180 may make placement determinations based in whole or in part on information or instructions received from a placement service of the control plane.

At block 510, the tertiary replica management component 180 can cause storage of the tertiary replicas, for example by generating instructions for their geometry on an identified set of the container servers 220, instructing a distributed replica coordinator 205A-205N regarding the source from which to copy the volume data (e.g., a snapshot or another volume), and instructing the distributed replica coordinator 205A-205N regarding the performance reservation. Thereafter, the distributed replica coordinator 205A-205N can cause storage of the volume data according to the desired geometry and with the determined performance reservations. In some embodiments the tertiary replica management component 180 may instead coordinate directly with the container servers 220 (or another suitable type of computing device for hosting the disclosed replica).

Figure 6:
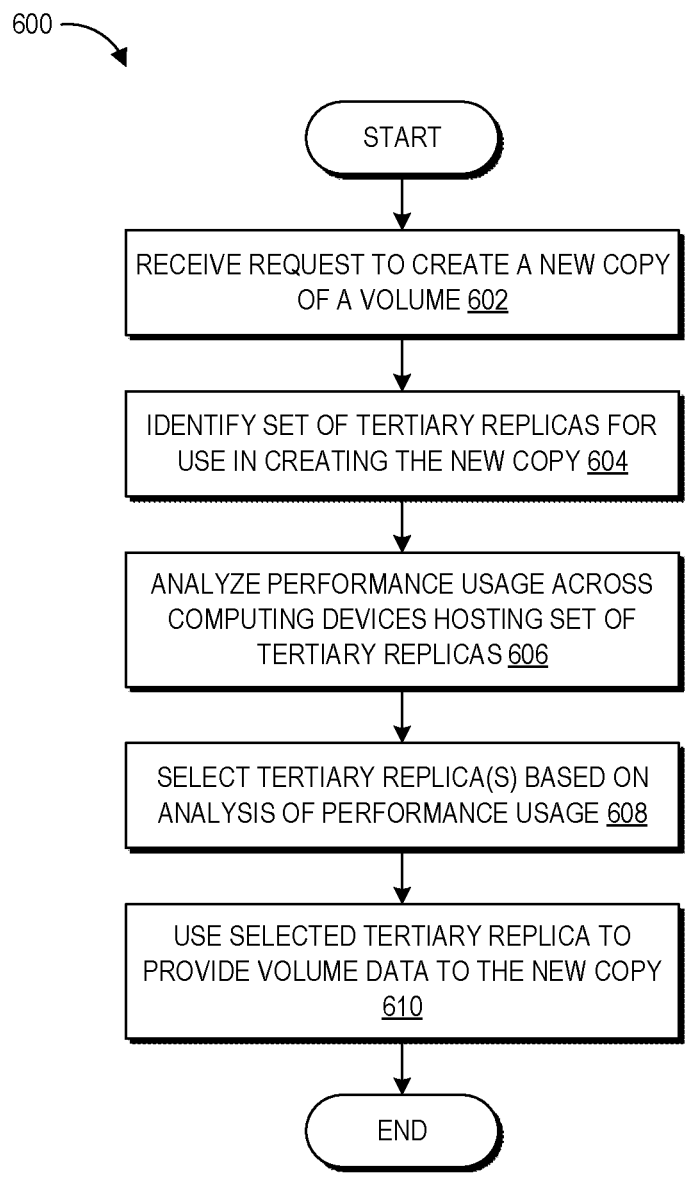
FIG. 6 is a flow diagram depicting an illustrative processing routine implemented to select particular tertiary replicas to use in the creation of new volumes, in accordance with illustrative embodiments.

Turning now to FIG. 6, a routine 600 implemented by the tertiary replica management component 180 for selecting particular tertiary replicas to use in the creation of new volumes will be described. In some implementations, the routine 600 can be used to select a tertiary replica set that will entirely support the creation of a target volume. In other implementations, a target volume may receive its data from another source, such as a snapshot. However, the target volume may begin serving I/O prior to being completely hydrated—that is, before all of the volume data blocks have been copied to the target volume server(s). In such scenarios, the routine 600 may be triggered by a get fault, where I/O is attempted to a block that has not yet been provided to the target volume server(s). In this scenario, a tertiary replica can be selected by the routine 600 to provide the block to the target volume servers with less latency than the block could be provided from the object storage servers 118.

At block 602, the tertiary replica management component 180 can receive a request indicating that a new copy of a volume is to be created, for example from a particular volume or snapshot. In response, at block 604 the tertiary replica management component 180 can identify a particular set of tertiary replicas that can be used to satisfy the request, for example the tertiary replica set created from the particular volume or snapshot.

At block 606, the tertiary replica management component 180 can analyze performance usage across the computing devices hosting the set of tertiary replicas. As described herein, this can include usage of shared resources by other volume replicas. The analyzed resources can be correspond to the resources of the tertiary volume performance reservations. In response, at block 608 the tertiary replica management component 180 can select one or more of the tertiary replicas based on this analysis. For example, the tertiary replica management component 180 can select a tertiary replica stored on a computing device that has sufficient unused resources (in combination with the reservation made for the tertiary replica) to satisfy the request. If, during the process of providing data to the new copy, the resource usage of the computing device changes such that the tertiary replica is no longer able to support the required IOPS, then a new tertiary replica may be selected.

Additionally or alternatively to blocks 606 and 608, some implementations may determine proximity (e.g., distance along a network) between servers configured to store the target volume and the servers that store the tertiary replicas, and can select the tertiary replica based on a shortest network distance to the target volume servers. Because multiple servers may host the target volume and multiple servers may host each tertiary replica, different portions of the volume data may come from different sources. Accordingly, this proximity analysis may be performed separately for different portions of the volume (e.g., different partitions).

In still further implementations, tertiary replicas may be selected based on other criteria. For example, tertiary replicas may be selected based on a round robin, based on health metrics of the tertiary replicas, or by assigning pools of tertiary replicas to specific users who are requesting target volumes and then selecting from among those assigned pools.

At block 610, the tertiary replica management component 180 can transmit instructions for the target volume servers to use the selected tertiary replica to provide the volume data to the new copy of the volume.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    a control plane server;
    a first set of servers in communication with the control plane server and having collectively stored thereon a first number of partitions of a primary replica of a volume and the first number of partitions of a secondary replica, wherein the volume has a plurality of additional replicas, and wherein the first set of servers is configured with computer-executable instructions to at least:
    process user-initiated read or write operations on the volume,
    reserve a first level of performance for the primary replica to use in processing the user-initiated read or write operations on the volume, wherein the first level of performance is one or more of Input/Output Operations Per Second (IOPS), network bandwidth, processing, or memory, and
    reserve the first level of reserved performance for the secondary replica;
    a second set of servers in communication with the control plane server and having collectively stored thereon a second number of partitions of a first additional replica of the plurality of additional replicas, wherein the second number of partitions is greater than the first number of partitions, and wherein the second set of servers is configured with computer-executable instructions to at least:
    reserve, based at least in part on a quantity of the plurality of additional replicas, a second level of performance, for the first additional replica to use, that is less than the first level of performance, and
    in response to a first request for a partition from the control plane server, transmit a partition of the first additional replica to the control plane server; and
    a third set of servers in communication with the control plane server and having collectively stored thereon the second number of partitions of a second additional replica of the plurality of additional replicas, wherein the third set of servers is configured with computer-executable instructions to at least:
    reserve the second level of performance for the second additional replica to use, and
    in response to a second request from the control plane server, transmit a partition of the second additional replica to the control plane server, wherein the partition of the second additional replica and the partition of the first additional replica correspond to different partitions of the volume;
    wherein the control plane server is configured to at least:
    detect that the primary replica has failed,
    based at least in part on detecting that the primary replica has failed,
    transmit the first request to the second set of servers, and
    transmit the second request to the third set of servers,
    receive the partition of the first additional replica from the second set of servers,
    receive the partition of the second additional replica from the third set of servers, and
    combine at least the partition of the first additional replica and the partition of the second additional replica to generate a new copy of the volume for processing the user-initiated read or write operations on the volume.

2. The system of claim 1, further comprising a fourth set of servers, and wherein the control plane server is further configured to store the new copy of the volume on the fourth set of servers.

3. The system of claim 2, wherein the control plane server is further configured to at least:
    identify a first level of current usage of performance of the second set of servers;
    identify a second level of current usage of performance of the third set of servers; and
    select the first and second additional replicas for use in creating the new copy of the volume based on the first level of current usage of performance of the second set of servers and the second level of current usage of performance of the third set of servers.

4. The system of claim 1, wherein the control plane server is further configured to at least:
    determine the quantity of the plurality of additional replicas; and
    determine the second level of performance, wherein the second level of performance is inversely related to the quantity of the plurality of additional replicas.

5. A computer-implemented method for efficient management of a storage volume in a distributed computing environment, the computer-implemented method comprising:
    determining a first level of performance for a primary replica of a volume of data, wherein the primary replica is stored as a first number of partitions distributed among a first set of servers;

receiving an instruction to generate an additional replica of the volume for processing reads and writes to the volume with the first level of reserved performance;

creating a first secondary replica of the volume, wherein the first secondary replica is stored as a second number of partitions distributed among a second set of servers, and wherein the second number of partitions is greater than the first number of partitions;

creating a second secondary replica of the volume, wherein the second secondary replica is stored as the second number of partitions distributed among a third set of servers;

determining a second level of performance for each of the first secondary replica of the volume and the second secondary replica of the volume, wherein the second level of performance is less than the first level of performance; and in response to receiving an instruction to create a new copy of the volume, obtaining a partition of the first secondary replica, obtaining a partition of the second secondary replica, wherein the partition of the second secondary replica and the partition of the first secondary replica correspond to different partitions of the volume, and combining at least the partition of the first secondary replica and the partition of the second secondary replica to generate the new copy of the volume.

6. The computer-implemented method of claim 5, further comprising:

selecting, based on current usage of performance of the second set of servers and the third set of servers, the first secondary replica and the second secondary replica.

7. The computer-implemented method of claim 6, further comprising, for the second set of servers and the third set of servers, determining the current usage of performance based at least on Input/Output Operations Per Second (IOPS) of a plurality of volumes stored on the second set of servers and the third set of servers, wherein the second level of performance specifies a reserved level of IOPS.

8. The computer-implemented method of claim 5, further comprising:

creating the new copy of the volume on a fourth set of servers.

9. The computer-implemented method of claim 8, further comprising:

selecting the first secondary replica based on determining that usage of performance of the second set of servers is less than usage of performance of a fifth set of servers that store a third secondary replica; and selecting the second secondary replica based on determining that usage of performance of the third set of server is less than usage of performance of the fifth set of servers.

10. The computer-implemented method of claim 8, further comprising:

selecting the first secondary replica at least partly based on determining a proximity between the second set of servers and the fourth set of servers; and selecting the second secondary replica at least partly based on determining a proximity between the third set of servers and the fourth set of servers.

11. The computer-implemented method of claim 5, wherein the first level of performance is one or more of Input/Output Operations Per Second (IOPS), network bandwidth, processing, or memory of the first set of servers, the computer-implemented method further comprising instructing reservation of the first level of performance for the primary replica stored on the first set of servers.

12. The computer-implemented method of claim 5, further comprising:

processing input and output operations on the volume using the primary replica.

13. The computer-implemented method of claim 5, further comprising:

determining a quantity of secondary replicas to create for the volume; and determining the second level of performance based at least partly on the quantity of secondary replicas, wherein the second level of performance is inversely related to the quantity of secondary replicas.

14. The computer-implemented method of claim 5, further comprising:

instructing reservation of the second level of performance on each of the second set of servers and the third set of servers.

15. A computer-implemented method comprising:

receiving a first instruction to store a primary replica of a volume on a first server with a first level of reserved performance of a resource of the first server;

configuring the primary replica of the volume on the first server for processing reads and writes to the volume with at least the first level of reserved performance;

receiving a second instruction to generate an additional replica of the volume for processing reads and writes to the volume with the first level of reserved performance, storing, on a set of servers, a plurality of secondary replicas of the volume, wherein each secondary replica of the plurality of secondary replicas is stored as partitions, and configuring, based at least in part on a quantity of the plurality of secondary replicas, each of the plurality of secondary replicas with a second level of reserved performance of a resource of the set of servers, wherein the second level of reserved performance is less than the first level of reserved performance; and in response to receiving a third instruction to create a new copy of the volume, obtaining a partition of a first secondary replica of the plurality of the secondary replicas, obtaining a partition of a second secondary replica of the plurality of the secondary replicas, wherein the partition of the first secondary replica and the partition of the second secondary replica correspond to different partitions of the volume, and combining at least the partition of the first secondary replica and the partition of the second secondary replica to generate the new copy of the volume.

16. The computer-implemented method of claim 15, further comprising:

determining to obtain the partition of the first secondary replica based at least partly on a current usage of the resource of a server storing the first secondary replica.

17. The computer-implemented method of claim 16, further comprising selecting the first secondary replica from among the plurality of secondary replicas based at least partly on comparing the current usage of the resource of the server storing the first secondary replica to current usages of the resource of other servers of the set of servers storing the plurality of secondary replicas.

18. The computer-implemented method of claim 16, further comprising determining to copy obtain the partition of the second secondary replica based at least partly on a current usage of the resource of a server storing the second secondary replica.

19. The computer-implemented method of claim 15, further comprising:
   determining to obtain the partition of the first secondary replica based at least partly on a proximity between a server storing the first secondary replica and a server configured to store the new copy of the volume.

20. The computer-implemented method of claim 19, further comprising determining to obtain the partition of the first secondary replica further based on determining that the server storing first secondary replica is the server configured to store the new copy of the volume.

* * * * *